United States Patent [19]
Narita et al.

[11] Patent Number: 5,506,688
[45] Date of Patent: Apr. 9, 1996

[54] APPARATUS FOR RECORDING VIDEO SIGNALS WITHIN RECORDING TRACKS EXTENDING OBLIQUELY ACROSS A MAGNETIC TAPE

[75] Inventors: Takato Narita; Norio Tanaka, both of Kanagawa, Japan

[73] Assignee: Sony Corporation, Tokyo, Japan

[21] Appl. No.: 368,393

[22] Filed: Jan. 3, 1995

Related U.S. Application Data

[63] Continuation of Ser. No. 81,171, Jun. 25, 1993, abandoned.

[30] Foreign Application Priority Data

Jun. 29, 1992 [JP] Japan ..................... 4-192773

[51] Int. Cl.$^6$ .............................. H04N 9/79; H04N 5/782
[52] U.S. Cl. ........................ 358/310; 358/335; 360/33.1
[58] Field of Search ............................ 358/335, 310, 358/312, 321, 338, 339, 328; 360/33.1, 10.1, 10.3, 73.01, 73.04–73.06, 10.2; H04N 5/78, 5/76, 5/782, 9/89, 9/79, 5/95, 5/92

[56] References Cited

U.S. PATENT DOCUMENTS

| | | | |
|---|---|---|---|
| 4,497,000 | 1/1985 | Terada et al. | 360/70 |
| 4,549,227 | 10/1985 | Hashimoto et al. | 358/310 |
| 4,862,292 | 8/1989 | Enari et al. | 358/33.1 |
| 4,916,548 | 4/1990 | Morioka et al. | 358/328 |
| 5,200,833 | 4/1993 | Suzuki et al. | 358/310 |
| 5,260,784 | 11/1993 | Kamiyama et al. | 358/335 |

FOREIGN PATENT DOCUMENTS 1288077  11/1989  Japan .................. H04N 5/92

*Primary Examiner*—Thai Q. Tran
*Attorney, Agent, or Firm*—William S. Frommer; Alvin Sinderbrand

[57] ABSTRACT

In an apparatus for recording video signals within recording tracks extending obliquely across a magnetic tape, having a rotary drum with first and second pairs of heads spaced from each other pair by a distance corresponding to one track pitch in a direction parallel to the axis of the rotary drum for recording video signals simultaneously on two recording tracks, while sequentially recording video signals on the magnetic tape within the recording tracks the video signals are recorded on said magnetic tape for longer than at the time of normal recording in such a manner that one of the two recording tracks on which the video signals are recorded by one of the second pair of heads overlaps part of the other recording track which is next to the one recording track and on which the video signals are recorded by one of said first pair of heads, so that by controlling the moving speed of the moving means in such a way so as to be slower than the normal moving speed at the time of normal recording, reductions in the signal to noise ratio can be avoided, and effective long time period recording can be achieved.

9 Claims, 3 Drawing Sheets

APPARATUS FOR RECORDING VIDEO SIGNALS WITHIN RECORDING TRACKS EXTENDING OBLIQUELY ACROSS A MAGNETIC TAPE

This application is a continuation of application Ser. No. 08/081,171, filed Jun. 25, 1993 now abandoned.

BACKGROUND OF THE INVENTION

1. Field of the Invention

The present invention relates to an apparatus for playing a video signal and more particularly to an apparatus for playing a video signal recorded simultaneously on two recording tracks over a long period of time using a pair of heads spaced from each other by a distance corresponding to one track pitch, in other words, recorded by an apparatus capable of high density video recording.

2. Description of the Related Art

The D2 format is a conventional recording method for digitally recording composite signals used in broadcasting equipment. In this kind of D2 format digital VTR, which is disclosed in U.S. Pat. No. 4,549,227, an analogue video signal is divided up into a plurality of digital channel signals. It is then possible to record these at a high density by bringing them into contact with a number of tracks and changing the azimuthal angle between tracks. A detailed description of this D2 format will now be given. In FIG. 1, a two channel recording method is shown where two channels are recorded in one scan. In FIG. 2, a single segment S is formed on a pair of tracks (channels), with three segments S0, S1, and S0 then making up a field.

An analogue signal is converted into a digital signal in order to get the necessary digital video signal data. After each segment S of this data, that is to say every third of a field as is shown in FIG. 2, has then been shuffled and undergone parity correction, the data is recorded onto the two channels divided into odd and even numbers, so as to to have interpolation within the fields. Also, four channels of digital audio signal data A1 to A4 are recorded at both ends of the video track. As can be seen from FIG. 1, these four channels are recorded two at each end of a recorded video track, and then repeated, two at each of the opposite two ends of the next recorded video track. This "double recording" is to provide data protection in case of damage to the edges of the tape. The longitudinally formed analogue channel is then used as the cue channel or the controller ID (timecode) channel and the actual recording has no guard band.

In this kind of D2 format digital VTR, the rotating head is used for both recording and playing, with two groups of heads being arranged respectively at 180 degrees in pairs shifted the width of one track apart from each other. The recording and playing heads are also shifted at an angle of 90 degrees about the drum axis away from each other.

In the kind of D2 format digital VTR adopting the two channel recording method described above, when recording over long periods of time, that is to say, in the case of high density recording, the recording method can be considered as a method where the overall track width has been uniformly reduced. In order to do this, the rear side head of the pair of heads for two channel recording, namely the head for recording the track at the upper rear side with respect to the recording track, has to be constructed so that its height can be changed by sliding it. Also, as the change in the width of the heads has to be very precise, separate heads have to be used for normal operation and operation over long periods of time.

It follows that, when using a recording method where, as described above, the overall track width has to be uniformly reduced to enable recording to take place over long periods of time, requirements such as the heads being movable and a separate head and changeover function being required complicate the overall construction of the apparatus. In addition to this, within this normal range the track width and the error rate are indirectly proportional to each other, so that the S/N ratio will be reduced. This cannot fail to have a detrimental effect on the sound and picture quality. An enhancing circuit must therefore be added to prevent these detrimental influences on the S/N ratio, which means that the overall scope and size of the circuit for signal processing will increase.

Since this invention sets out to solve the problems described above, its purpose is to provide a video signal recording apparatus which can record over long periods of time simply by changing the speed of movement of the magnetic tape, without the signal to noise ratio being reduced.

SUMMARY OF THE INVENTION

According to the first aspect of the invention, there is provided an apparatus for recording video signals within recording tracks extending obliquely across a magnetic tape, the apparatus comprising: a rotary drum having a pair of heads for recording video signals, simultaneously on two recording tracks; moving means for moving the magnetic tape longitudinally; and controlling means for controlling the moving means in a manner such that one of the two recording tracks on which the video signals are recorded by one of the pair of heads overlaps with part of the other recording track on which the video signals are recorded by the other head.

According to a second aspect of the invention, there is provided a method for recording video signals with recording tracks extending obliquely across a magnetic tape, the method comprising: moving the magnetic tape around a rotating drum having first and second pairs of heads spaced from each other pair by 180 degrees about the axis of the rotating drum for recording video signals simultaneously on two recording tracks; and controlling the moving speed of the magnetic tape in such a manner that one of the two recording tracks on which the video signals are recorded by one of the second pair of heads overlaps part of the other recording track which is next to the one recording track and on which the video signals are recorded by one of the first pair of heads.

DETAILED DESCRIPTION OF THE PREFERRED EMBODIMENT

The following is a description of a preferred embodiment of the present invention suitable for carrying out the kind of 2 channel recording with D2 format digital VTRs described above.

Figure 3:
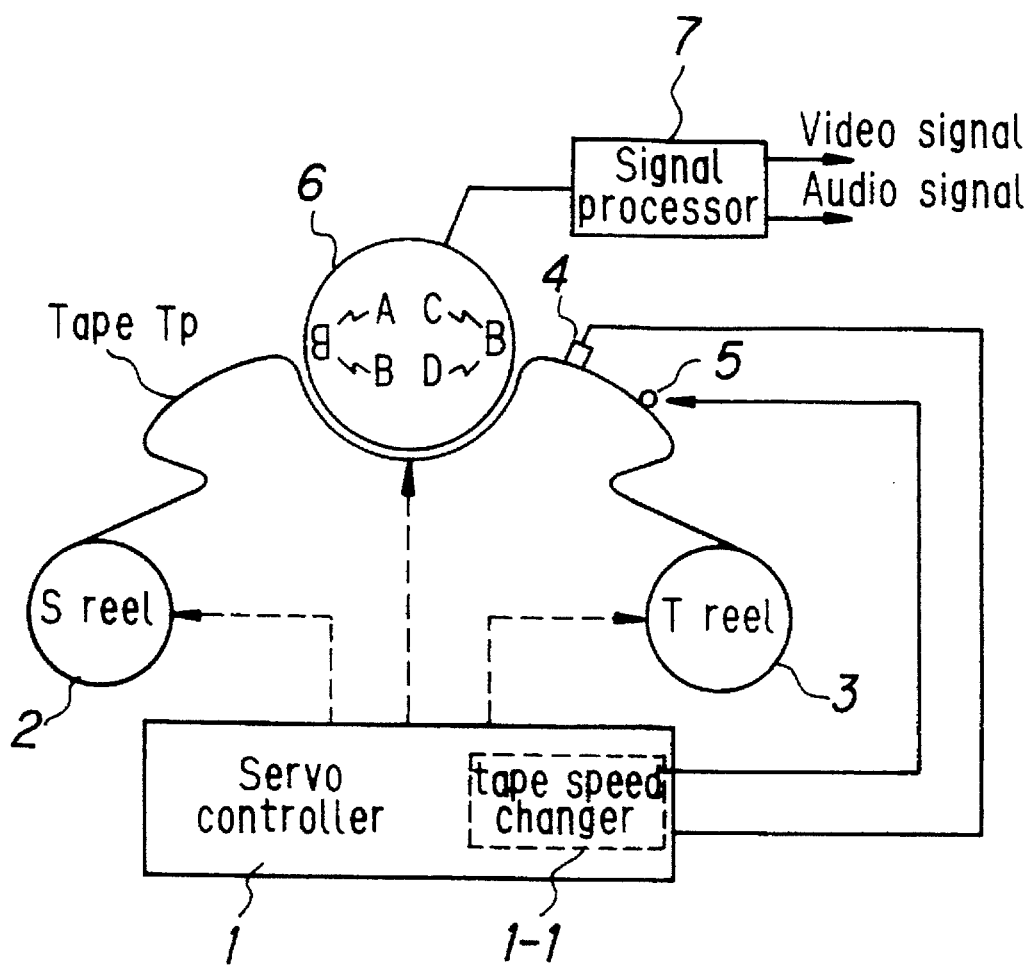
FIG. 3 is a schematic view of the construction of the servo system for the video signal playing apparatus according to the present invention.

FIG. 3 is a schematic view of the construction of the servo system for the VTR in this invention which includes servo controller 1, supply reel "S" 2 for supplying the tape Tp, take reel "T" for taking the tape Tp, the control head CTL 4, driver capstan 5 for moving the tape Tp, numeral 6 denotes the rotating head drum 6 and signal processing area 7 for processing the audio and video signals when recording and playing back.

The tape Tp wraps around the rotating head drum 6 at a wrapping angle of 180 degrees with respect to the drum axis. Two pairs of rotating heads, A and B, and C and D, are then arranged at 180 degrees away from each other with respect to the drum axis. The heads A and B are spaced slightly away from each other along the direction of rotation of the drum and the heads C and D are respectively positioned directly opposite the heads A and B. Also, the heads are mounted on the drum so as to be inclined at a track pitch (tp) to the vertical axis of rotation.

There is also a tape speed changing function 1-1 in the servo controller 1 for recording over long periods of time.

Figure 4:
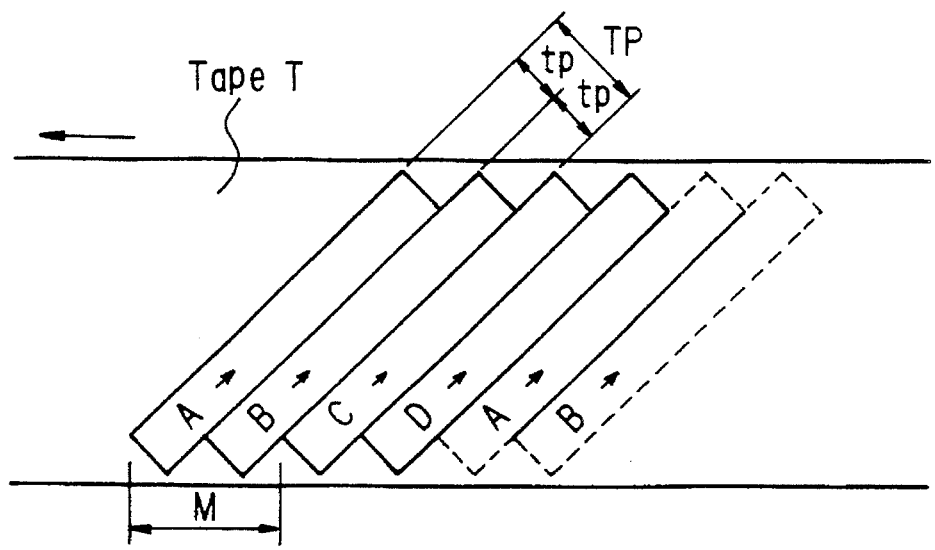
FIG. 4 is an explanatory view describing the normal mode recording pattern.

FIG. 4 shows the recording pattern which is usually made on the tape during usual normal mode recording. First, two helical tracks are recorded side by heads A and B by side at almost the same time, shifted at a track pitch tp from each other, to give a total track pitch TP which is equal to 2 ytp. Then, after the drum has made half a rotation, two further tracks are recorded next to the two tracks already recorded, by the heads C and D. During the recording of two tracks the tape moves a distance M, and thus the tape speed is controlled.

In reality, however, the track pitch for a particular track is decided in accordance with the track which is to be recorded next to it afterwards. This is to say that the track pitch for head A is decided by the shift in the position of heads A and B. Also, the track pitch for head B will depend on the track recording position of head C. It is therefore the distance moved M which is decided by the speed of the tape.

Figure 5:
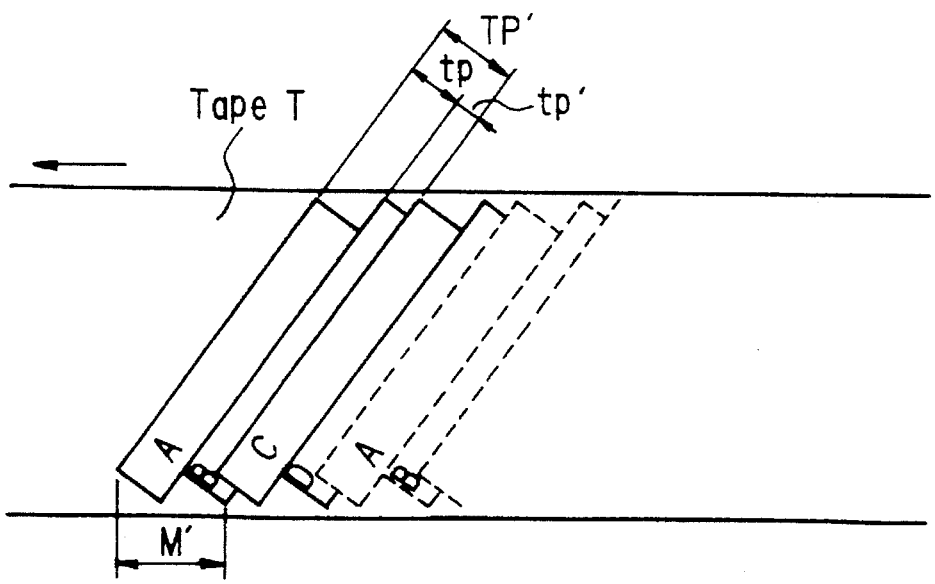
FIG. 5 is an explanatory view describing the long time period recording mode pattern.

FIG. 5 is a view of the pattern recorded on the tape by the present invention when in the long time period recording mode. In this case, just the tape speed is changed to give a distance moved of M', as shown in FIG. 5, by operating the tape speed changer 1-1 shown in servo controller 1 in FIG. 3 by changing its contents. It is not necessary to change items such as the head width or the mount height. This tape speed controller 1-1 could, for example, be realized within the software in the micro-computer based servo controller 1.

For example, if the tape speed when recording in the long time period recording mode is made to be three quarters of that of the tape speed when recording in normal operation, the track pitch tp of the track recorded by head A (track A) will not change. The track recorded by head B (track B) will, however, impinge into part of the area of tape onto which the preceding track C will be recorded, giving an effective track pitch of tp'. For this tape speed, tp' is approximately =½ tp, which is half that of the track pitch for the normal mode, and the track pitch for two tracks becomes TP' =1.5 tp=¾ TP. It follows that, similarly, the track pitch tp for the head C will be the same as that for the case for normal operation but the pitch tp for track D will become half.

In this way, without changing the pitch of track A which is decided according to the height at which the head is mounted, just the pitch of track B can be changed by controlling the tape speed. In this way, the effective pitch TP' which two channels (two tracks) made in one scan take up can be reduced to ¾ TP, to make high density recording possible.

In the long time period recording mode in this invention, as described previously, the tracks B and D are recorded at a high density and a reduced pitch. However, reductions in the quality of the recorded signal for those tracks is kept to within a tolerable level in the following way.

Figure 1:
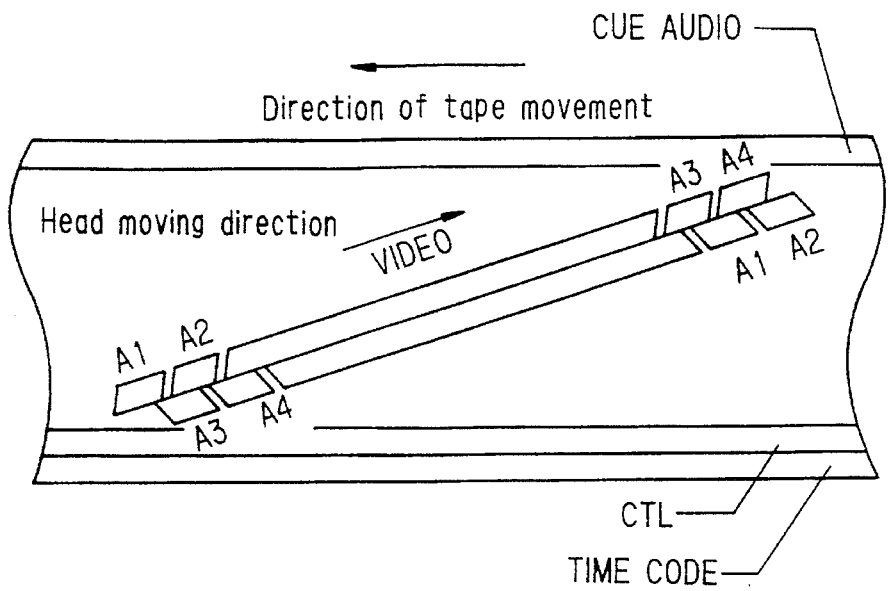
FIG. 1 is a conceptual view describing the D2 format recording pattern.
Figure 2:
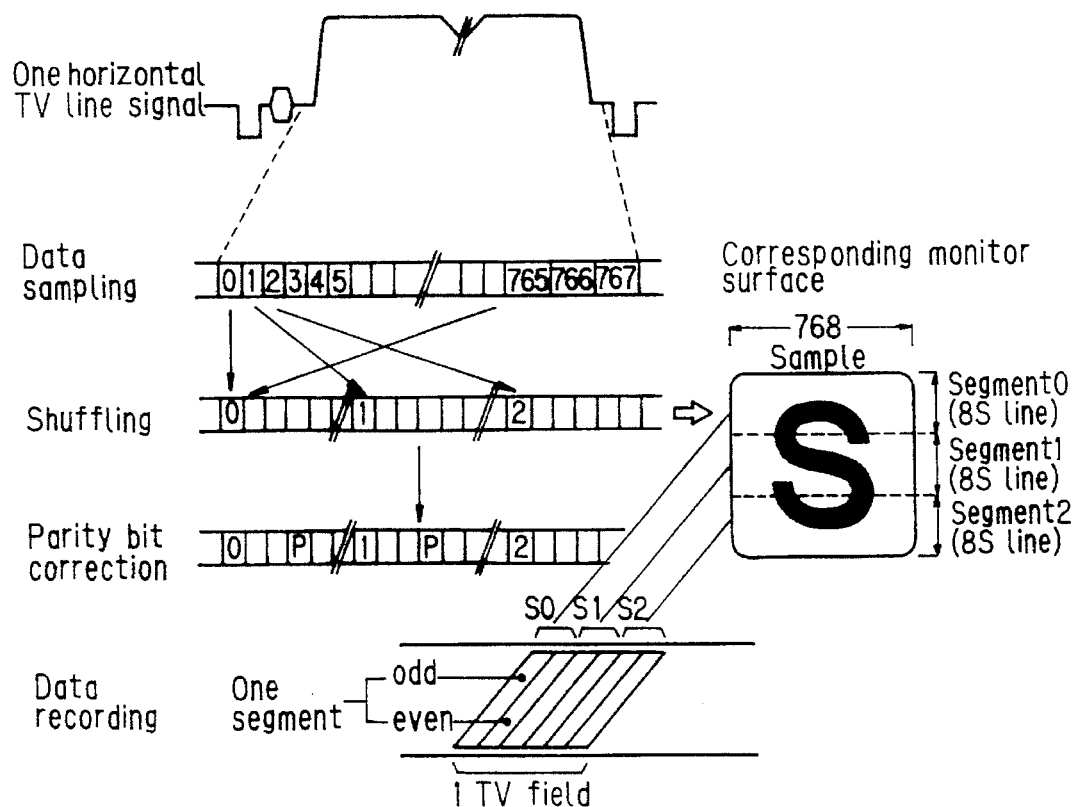
FIG. 2 is an explanatory view describing the D2 format recording method.

For example, in the case of two channel digital recording using the kind of D2 format described previously, by "shuffling" the neighboring data which has a high degree of correlation between the separate tracks A and B on which it was recorded (as shown in FIG. 2), even if the error rate for track B is high, a picture which has suffered little degradation can be played back by making interpolations from the picture element data on the neighboring track. The great advantage of this approach is that the error rate for the data recorded on track A and track C is not increased.

The long time period recording mode in this invention would also be suitable for use in analogue recording. For example, when carrying out two channel recording using the kind of luminance and chrominance signals found in Betacam systems, if the luminance signal is recorded on tracks A and C, and the chrominance signal is recorded on tracks B and D, the signal to noise ratio in the noise sensitive luminance signal can be kept high even when in the long time period recording mode.

Moreover, the S/N ratio for the long time period recording mode can be increased by switching over between equalizers having two different kinds of characteristics. However, as only the signals on track B and track D have to be re-equalized, the scope of the characteristic changeover can be reduced by half.

By using a VTR which is in accordance with this invention, recording can be carried out using the same track pitch for normal mode recording and the long time period recording mode. In this way, there is no reduction in the S/N signal of the playback signal and if this signal recorded over a long period of time is made to be the main signal, the picture quality and sound quality when it is played back will be no different to that of normal mode.

The long time period recording mode for the present invention can be realized simply by putting additional software into the software for controlling the changeover of the tape speed of the capstan servo. It is not necessary to change the height or width of the recording heads. This can therefore be achieved simply by modifying the software in conventional VTRs.

What is claimed is:

1. An apparatus for recording video signals within recording tracks extending obliquely across a magnetic tape, said apparatus comprising:

a rotary drum having first and second recording heads for simultaneously recording the video signals on a pair of adjacent recording tracks;

moving means for moving said magnetic tape longitudinally; and controlling means for controlling the magnetic tape moving speed of said moving means such that when the video signals are recorded on a first pair of adjacent recording tracks by said first and second recording heads, a portion of one of said first pair of adjacent recording tracks is written over an overlapping portion of one of a previously recorded second pair of adjacent recording tracks and the other one of said second pair of adjacent recording tracks is not written over so that a remaining portion of said one of said second pair of adjacent recording tracks is of lesser width than the other one of said second pair of adjacent recording tracks.

2. An apparatus for recording video signals within recording tracks extending obliquely across a magnetic tape, said apparatus comprising:

a rotary drum having first and second pairs of recording heads, said first pair being separated at an angle of 180 degrees in respect to the axis of said rotary drum from said second pair, each of said first and second pairs being respectively operable for simultaneously recording the video signals on a pair of adjacent recording tracks;

moving means for moving said magnetic tape longitudinally; and controlling means for controlling the magnetic tape moving speed of said moving means such that when the video signals are recorded on a first pair of adjacent recording tracks by said first pair of recording heads, a portion of one of said first pair of adjacent recording tracks is written over an overlapping portion of one of a second pair of adjacent recording tracks previously recorded by said second pair of recording heads and the other one of said second pair of adjacent recording tracks is not written over so that a remaining portion of said one of said second pair of adjacent recording tracks is of lesser width than the other one of said second pair of adjacent recording tracks.

3. A video signal recording apparatus according to claim 2, wherein said controlling means controls the magnetic tape moving speed of said moving means to be slower than a normal magnetic tape moving speed used for normal recording.

4. A video signal recording and reproducing apparatus for recording and reproducing video signals within recording tracks extending obliquely across a magnetic tape, said apparatus comprising:

a rotary drum having first and second pairs of recording heads, said first pair being separated at an angle of 180 degrees in respect to the axis of said rotary drum from said second pair, each of said first and second pairs being respectively operable for simultaneously recording the video signals on a pair of adjacent recording tracks;

moving means for moving said magnetic tape longitudinally;

controlling means for controlling the magnetic tape moving speed of said moving means such that when the video signals are recorded on a first pair of adjacent recording tracks by said first pair of recording heads, a portion of one of said first pair of adjacent recording tracks is written over an overlapping portion of one of a second pair of adjacent recording tracks previously recorded by said second pair of recording heads and the other one of said second pair of adjacent recording tracks is not written over so that a remaining portion of said one of said second pair of adjacent recording tracks is of lesser width than the other one of said second pair of adjacent recording tracks; and signal processing means for recovering the video signals with improved signal-to-noise (S/N) ratio reproduced from said other one of said second pair of adjacent recording tracks and for recovering the video signals represented by the written over portion of said one of said second pair of adjacent recording tracks by interpolating the video signals stored in the other one of said second pair of adjacent recording tracks;

wherein the video signals are D2 format signals.

5. An apparatus according to claim 2, wherein the video signals are betacam format signals and a luminance signal is recorded on said one of said first pair of adjacent tracks and a chrominance signal is recorded on said one of said second pair of adjacent tracks.

6. An apparatus for recording and reproducing video signals within recording tracks extending obliquely across a magnetic tape, said apparatus comprising:

a rotary drum having first and second pairs of recording heads, the heads in a respective pair being displaced from each other by a distance in a direction parallel to the axis of said drum corresponding to one track pitch when said magnetic tape is moved at a normal magnetic tape moving speed for normal recording, each of said first and second pairs being respectively operable for simultaneously recording the video signals on a pair of adjacent recording tracks;

moving means for moving said magnetic tape such that video signals are sequentially recorded on said magnetic tape by said first and second pairs of heads;

controlling means for controlling the magnetic tape moving speed of said moving means so as to be slower than said normal magnetic tape moving speed so that when the video signals are recorded on a first pair of adjacent recording tracks by said first pair of recording heads at said slower tape speed, a portion of one of said first pair of adjacent recording tracks is written over an overlapping portion of one of a second pair of adjacent recording tracks previously recorded by said second pair of recording heads and the other one of said second pair of adjacent recording tracks is not written over such that a remaining portion of said one of said second pair of adjacent recording tracks is of lesser width than the other one of said second pair of adjacent recording tracks, the video signals recorded on said magnetic tape representing a longer recording time than the video signals recorded using normal recording; and signal processing means for recovering the video signals with improved signal-to-noise (S/N) ratio reproduced from said other one of said second pair of adjacent recording tracks and for recovering the video signals represented by the written over portion of said one of said second pair of adjacent recording tracks by interpolating video signals stored in the other one of said second pair of adjacent recording tracks.

7. A method of recording video signals with recording tracks extending obliquely across a magnetic tape, said method comprising:

moving said magnetic tape around a rotating drum having first and second pairs of recording heads, said first pair being separated from said second pair at an angle of 180 degrees in respect to the axis of said rotating drum, for simultaneously recording the video signals on respective pairs of adjacent recording tracks; and controlling the moving speed of said magnetic tape such that when the video signals are recorded on a first pair of adjacent recording tracks by said first pair of recording heads, a portion of one of said first pair of adjacent recording tracks is written over an overlapping portion of one of a second pair of adjacent recording tracks previously recorded by said second pair of recording heads and the other one of said second pair of adjacent recording tracks is not written over so that a remaining portion of said one of said second pair of adjacent recording tracks is of lesser width than the other one of said second pair of adjacent recording tracks.

8. An apparatus for recording and reproducing shuffled D2 format video data within recording tracks extending obliquely across a magnetic tape, said apparatus comprising:

a rotary drum having first and second recording heads for simultaneously recording said shuffled video data on a pair of adjacent recording tracks;

moving means for moving said magnetic tape longitudinally;

controlling means for controlling the magnetic tape moving speed of said moving means such that when said shuffled video data are recorded on a first pair of adjacent recording tracks by said first and second recording heads, one of said first pair of adjacent recording tracks is written over an overlapping portion of one of a previously recorded second pair of adjacent recording tracks and the other one of said second pair of adjacent recording tracks is not written over so that a remaining portion of said one of said second pair of adjacent recording tracks is of lesser width than the other one of said second pair of adjacent recording tracks; and signal processing means for recovering the shuffled video data with improved signal-to-noise (S/N) ratio reproduced from said other one of said second pair of adjacent recording tracks and for recovering shuffled the video data represented by the written over portion of said one of said second pair of adjacent recording tracks by interpolating shuffled the video data stored in the other one of said second pair of adjacent recording tracks.

9. An apparatus for recording analog format video signals within recording tracks extending obliquely across a magnetic tape, the analog format video signals having a luminance component and a chrominance component, said apparatus comprising:

a rotary drum having first and second recording heads for simultaneously recording the video signals on a pair of adjacent recording tracks, the luminance component being recorded on one of said pair of adjacent recording tracks and the chrominance component being recorded on the other of said pair of adjacent recording tracks;

moving means for moving said magnetic tape longitudinally; and controlling means for controlling the magnetic tape moving speed of said moving means such that when the video signals are recorded on a first pair of adjacent recording tracks by said first and second recording heads, the one of said first pair of adjacent recording tracks on which the luminance component is recorded is written over an overlapping portion of one of a previously recorded second pair of adjacent recording tracks on which the chrominance component is recorded and the other one Of said second pair of adjacent recording tracks on which the luminance component is recorded is not written over so that a remaining portion of said one of said second pair of adjacent recording tracks on which said chrominance component is recorded is of lesser width than the other one of said second pair of adjacent recording tracks on which the luminance component is recorded.

* * * * *